United States Patent [19]

Haseba

[11] Patent Number: 4,907,078
[45] Date of Patent: Mar. 6, 1990

[54] METHOD FOR REPRODUCING COLOR IMAGES WHICH ARE DISTINGUISHABLE IN A DOCUMENT HAVING ONLY TWO COLORS

[75] Inventor: Mitsuo Hasebe, Tokyo, Japan
[73] Assignee: Ricoh Company, Ltd., Tokyo, Japan
[21] Appl. No.: 212,151
[22] Filed: Jun. 13, 1988

Related U.S. Application Data

[63] Continuation of Ser. No. 902,605, Sep. 2, 1986, abandoned.

[30] Foreign Application Priority Data

Sep. 11, 1985 [JP] Japan .................................. 60-199371

[51] Int. Cl.⁴ .............................................. H04N 1/46
[52] U.S. Cl. ........................................ 358/81; 358/75; 356/425
[58] Field of Search ..................................... 358/75–82; 382/17, 58; 356/402, 407, 416, 419, 425

[56] References Cited

U.S. PATENT DOCUMENTS

| 4,110,826 | 8/1978 | Möllgaard et al. ..................... 358/75 |
| 4,170,987 | 10/1979 | Anselmo et al. ..................... 128/665 |
| 4,318,122 | 3/1982 | White ..................................... 358/75 |
| 4,538,182 | 8/1985 | Saito et al. ........................... 358/80 |
| 4,577,218 | 3/1986 | Kurata ................................... 358/75 |
| 4,614,967 | 9/1986 | Sayanagi .............................. 358/75 |
| 4,816,900 | 3/1989 | Tokunaga et al. .................... 358/75 |

FOREIGN PATENT DOCUMENTS 220903  5/1987  European Pat. Off. .
251278  1/1988  European Pat. Off. .
26976   2/1987  Japan .

Primary Examiner—James J. Groody
Assistant Examiner—Robert M. Bauer
Attorney, Agent, or Firm—Oblon, Spivak, McClelland, Maier & Neustadt

[57] ABSTRACT

A method of processing information on color images wherein light rays produced by irradiating a color document are split into light rays of two different wavelengths. The two types of light rays obtained in this way are converted into more than four types of output signals which are developed in different colors in accordance with the volumes of light and/or the wavelengths.

4 Claims, 4 Drawing Sheets 4,907,078

METHOD FOR REPRODUCING COLOR IMAGES WHICH ARE DISTINGUISHABLE IN A DOCUMENT HAVING ONLY TWO COLORS

This application is a continuation of application Ser. No. 06/902,605, filed on September 2, 1986, now abandoned.

FIELD OF THE INVENTION AND RELATED ART STATEMENT

This invention relates to methods of processing information on color images wherein an original in color is subjected to color separation and information on the color for each pictures element obtained by color separation is processed in the form of digital signals, and more particularly it deals with a method of processing color images handled in copying apparatus, facsimile systems, image files, etc.

A color image read-out system is known in which color images are each split into optical bundles of two different wavelength bands so as to read out each color image as information on four colors of black, red, blue and white.

In color printers of personal computers, it is usual practice to indicate color images not only in the four colors referred to hereinabove but also in at least eight colors including black, red, blue, green, cyan, yellow and magenta.

Thus the color image read-out system of the prior art referred to hereinabove has suffered the disadvantage that it is unable to handle the processing of color images in the color printer of a personal computer.

OBJECT AND SUMMARY OF THE INVENTION

This invention has as its object the provision of a method of discriminating and processing an image of more than four colors based on information obtained by resolving a color original into light rays of two different wave-length bands.

The outstanding characteristic of the invention enabling the aforesaid object to be accomplished includes irradiating a color original with white light to produce light rays of an optical image of the color original, splitting the light rays by means of a prism or a filter into two types of light rays of a low wavelength band and a high wavelength band divided by using a predetermined wavelength as a boundary, forming images of the two types of light rays on separate light receivers, taking out four types of digital output signals from the light receivers in accordance with the volume of light (luminous energy) incident thereon, and developing the images in more than four different colors in accordance with a signal obtained by combining the digital signals.

The invention enables a copy of a document in color to be printed in seven different colors by splitting light rays into two types of light rays of different wavelength bands. This allows a copy of an original or document to be produced in subdued color, so that the method can achieve the results of providing copies of documents in which different sections or paragraphs are printed in different colors in which colorfulness of the image is not the prime factor.

A color printer is usually required to have three to four color recording sections or developing devices. When the present invention is incorporated in a color printer, only two color recording sections need be provided, thereby enabling a printing operation to be performed with increase speed and allowing costs to be reduced.

DESCRIPTION OF THE PREFERRED EMBODIMENT

The method according to the invention will now be described by referring to the accompanying drawings.

Figure 1:
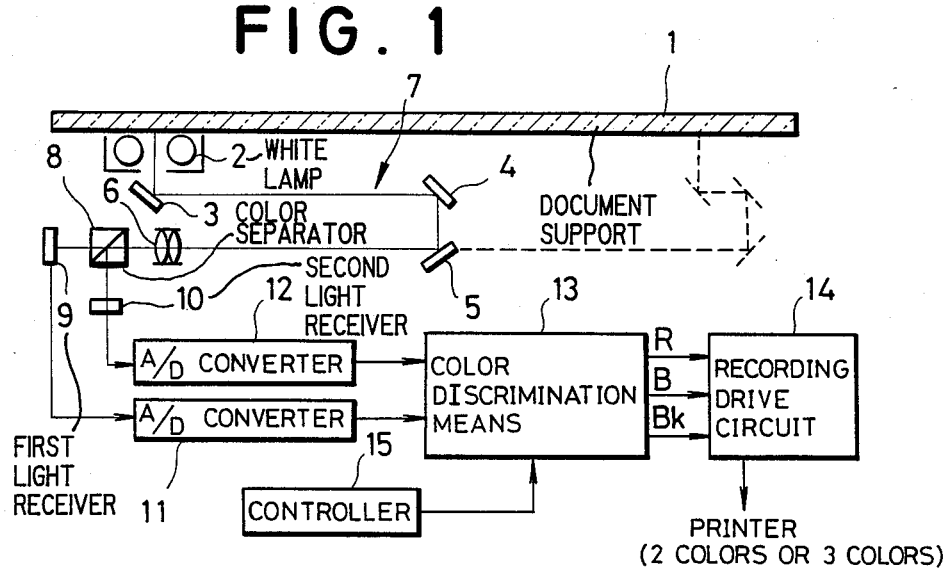
FIG. 1 is a view in explanation of a copying aparatus suitable for carrying the method according to the invention into practice.

FIG. 1 shows a copying apparatus in which the invention can be incorporated. An original or document in a plurality of colors placed on a document support 1 is irradiated with a white lamp 2 and reflects light rays to form an optical image of the document by means of a known optical system including mirrors 3, 4 and 5 and a lens 6. The light rays representing the image of the document are split into two types of light rays by a color separator 8, such as a spectral prism. The two types of light rays are incident on a first light receiver 9 or a first chargecoupled device or CCD, and a second light receiver 10 or a second CCD, respectively, to form separate images thereon.

The colors in which the document of a plurality of colors is represented may include white and black in addition to the three primary colors or yellow, magenta and cyan and the complementary colors or blue, green and red.

Figure 2:
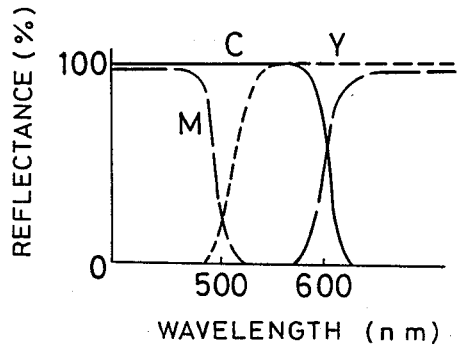
FIG. 2 is a diagrammatic representation of the reflectance characteristics of three primary colors.

FIG. 2 shows the spectral reflectance of the three primary colors or yellow, magenta and cyan. In the diagram shown in FIG. 2, the abscissa represents the wavelength in nm and the ordinate indicates the reflectance in %. A solid curve C, a broken curve Y and a dash-and-dot curve M represent the characteristic of cyan, yellow and magenta, respectively.

Figure 3:
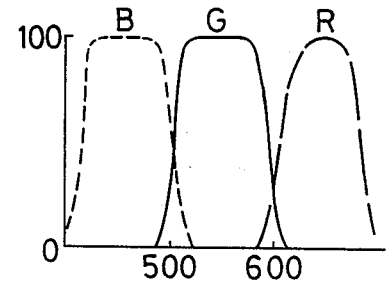
FIG. 3 is a diagrammatic representation of the reflectance characteristics of complementary colors.

FIG. 3 shows the spectral reflectance of the complementary colors. In the diagram shown in FIG. 3, the abscissa represents the wavelength in nm and the ordinate indicates the reflectance in %. A solid curve G, a broken curve B and a dash-and-dot curve R represent the characteristic of green, blue and red, respectively.

In the light receivers 9 and 10, a white portion having the greatest volume of light has an output of the largest value. Next come the outputs of three primary colors of yellow, magenta and cyan. The outputs of complementary colors of blue, green and red each have a lower value, and black has an output of the lowest value. Thus the outputs of the light receiver 9 and 10 can be broadly divided into four types.

Figure 4:
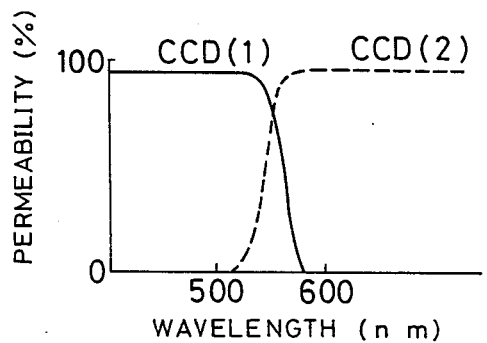
FIG. 4 is a diagrammatic representation of one example of the permeability characteristic of the color separator element used in the method according to the invention.

By taking the characteristic curves shown in FIGS. 2 and 3 into consideration, let us split the light rays of the image into two types or light rays of a low wavelength band and a high wavelength band as divided by wavelengths between 500 nm and 600 nm serving as a boundary. Then it is possible to discriminate various colors based on the wavelengths of light rays considered in combination with the outputs of the light receivers 9 and 10. Thus, by using as the color separator 8 a spectral prism or a spectral filter having a permeability characteristic as shown in FIG. 4, the light rays representing the images are split into the two wavelength bands. In FIG. 4, the abscissa represents the wavelength nm and the ordinate indicates the permeability %.

In one embodiment, the light rays representing the images are split in accordance with the characteristic curves shown in FIG. 4 into the low wavelength band and high wavelength band, and the light rays of the low wavelength band [indicated by CCD (1)] and the high wavelength band [indicated by CCD (2)] are incident on the first light receiver 9 and second light receiver 10 to form images thereon respectively. In this embodiment, an output of the first light receiver 9 is converted by a first A/D converter 11 into four types of digital signals, such as signals of 2 bits (4 levels), for example, in accordance with the volume of light, and an output of the second light receiver 10 is converted by a second A/D converter 12 into digital signals in accordance with the volume of light.

Figure 5:
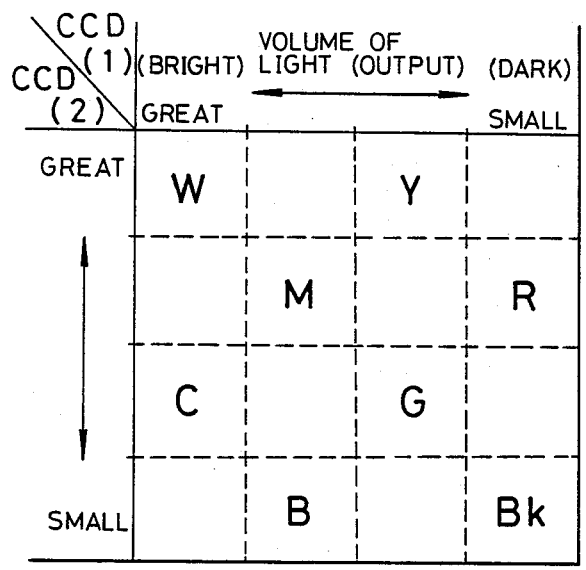
FIG. 5 is a view of the color discrimination matrix obtained by combining the outputs of two light receivers.

By combining the four types of digital signals from the first converter 11 with the four types of digital signals from the second converter 12, it is possible to form a matrix of sixteen color positions as shown in FIG. 5.

In FIG. 5, the outputs of the first A/D converter 11 representing the image formed on the first light receiver 9 are arranged in transverse rows from left to right in the order of the greatness of the volume of light, and the outputs of the second A/D converter 12 representing the images formed on the second light receiver 10 are likewise arranged in vertical columns from top to bottom. Thus the volume of light is the greatest (brightest color) on the left side of the transverse rows and on the top side of the vertical columns, and the smallest (darkest color) on the right side of the transverse rows and on the bottom side of the vertical columns.

When the outputs of the two light receivers 9 and 10 are both at the highest level, the color is white (indicated by W in FIG. 5); when they are both at the lowest level, the color is black (indicated by Bk in FIG. 5).

That is, the positions of the three primary colors or cyan, yellow and magenta in the matrix shown in FIG. 5 are determined based on the characteristics shown in FIGS. 2 and 3. In FIG. 3, C, Y and M refer to cyan, yellow and magenta respectively. The outputs of the first light receiver 9 are arranged in the order of C, M and Y according to the greatness of the volume of light, and those of the second light receiver 10 are arranged in the order of Y, M and C according to the volume of light. With regard to the complementary colors, the outputs of the first light receiver 9 are arranged based on the characteristics shown in FIGS. 3 and 4 in the order of blue (B), green (G) and red (R), and those of the second light receiver 10 are arranged in the order of red (R), green (G) and blue (B) according to the volume of light. The positions of the corresponding complementary colors can be distinguished by the positions in the matrix of FIG. 5 indicated by B, G and R.

By using a two-color printer to perform printing in color by varying with darkness or tone of colors based on the outputs of the two light receivers 9 and 10, it is possible to represent information of the original in eight colors shown in FIG. 5 in eight tones of colors that can be discriminated by the naked eye.

Figure 6:
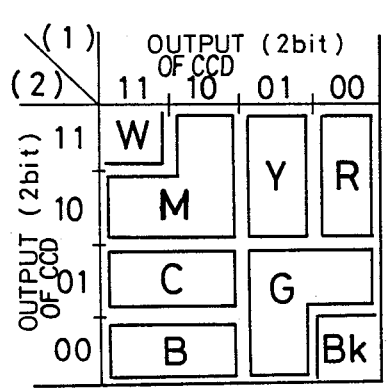
FIG. 6 is a view of the matrix showing the scope of color discrimination of the matrix shown in FIG. 5.

FIG. 6 shows the scope of each of eight tones of colors that has been determined based on the positions of colors arranged in the matrix shown in FIG. 5. In FIG. 6, each block shows a scope representing the same color tone. In FIG. 6, the outputs of the first A/D converter 11 and second A/D converter 12 are arranged in transverse rows and in vertical columns, respectively. In FIG. 5, the outputs are arranged in the order of the greatness of the volume of light, but in FIG. 6, they are arranged in the order of 2-bit digital signals.

By recording the outputs of the first light receiver 9 and second light receiver 10 with inks having the spectral reflectances CCD (1) and CCD (2) shown in FIG. 4 respectively, it is possible to provide sixteen tones of colors including colors in half-tone as shown in FIG. 5. There are limits to the discriminating power of the human eyes, and difficulty would particularly be experienced in discriminating the four tones of colors arrange diagonally from W to Bk in FIG. 5 because they are gray (fuzzy).

Figure 7:
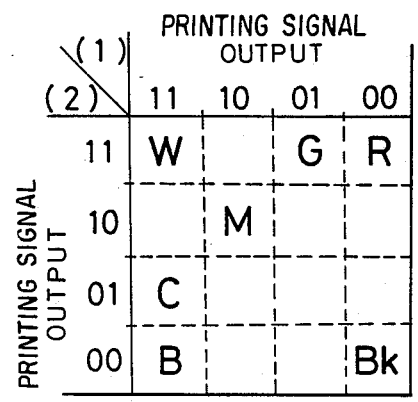
FIG. 7 is a view of the matrix for discriminating seven colors which represents a modification of the matrix shown in FIG. 5.

By taking the discriminating power of the human eyes, it is possible to use the system of differentiating colors as shown in FIG. 7 in place of the arrangement shown in FIG. 5. In the matrix shown in FIG. 7, colors that can be distinguished are arranged in three stages transversely, vertically and diagonally. That is, the colors represented include single colors in three stages and mixed colors (gray) in three stages, so that discrimination of different sections of the document can be achieved by using seven color tones. This means that yellow out of the eight colors is omitted. This poses no problem in actual practice because yellow is not usually used singly.

Figure 8:
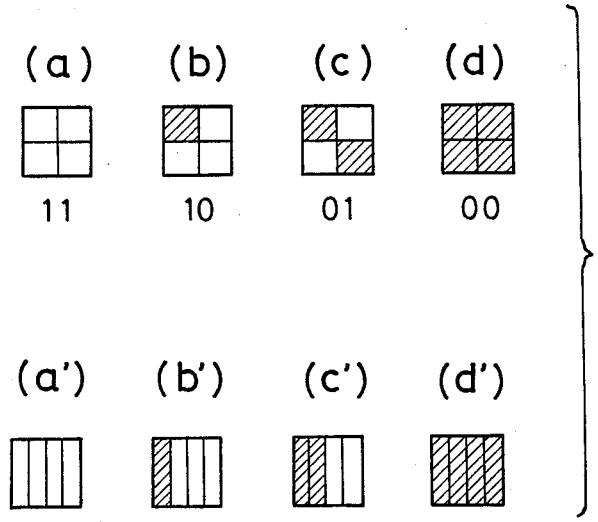
FIG. 8 shows one example of picture elements for recording the digital putputs of the light receivers, the picture elements (a), (b), (c) and (d) representing different bits and the picture elements (a'), (b'), (c') and (d') being modifications of the (a), (b), (c) and (d) respectively.

One example of using the minimum four picture elements of a printer for recording the 2-bit digital outputs of the first and second A/D converters 11 and 12 for arranging colors in vertical columns and transverse rows in FIG. 7 is shown in FIG. 8. In FIG. 8, digital signals 11, 10, 01 and 00 are shown in (a), (b), (c) and (d) respectively. By using these digital signals, it is possible to represent color tones corresponding to the seven colors except for yellow. In this case, the magenta and green in the document are represented by other colors. Thus, the colors used in the document cannot be reproduced faithfully. In the case of ordinary documents, it is usually the case that different colors are used to distinguish different sections of the document from each other. When this is the case, the tone of a color is of no importance. Thus, when a copy is made of an original, no problem would arise even if the colors used in the original are not faithfully reproduced in the copy, so long as the colors representing different sections or paragraphs in the copy are the same as those used in the original. Thus the use of the tones of colors shown in FIG. 7 would serve the purpose of distinguishing the different sections of the copy from each other.

This system can be incorporated in printers of the ink jet system, thermal transfer-printing type, heat-sensing type, electrostatic recording type, electrophotographic type and silver salt photographic type (polaroid).

In FIG. 1, the outputs of the A/D converters 11 and 12 are supplied to color discrimination means 13 constructed based on the arrangement of colors shown in FIG. 5 or 7. The color discrimination means 13 actuates a recording drive circuit 14 to operate a two-color printing section (red and blue) or a three-color printing section (red, blue and black), to produce a copy in two or three colors.

The invention has been described as using a spectral prism. However, the invention is not limited to the use of this specific filter and any other known color separator may be used in place of the spectral prism.

Assume that a copy of an original in color produced by recording the image of the original in accordance with the arrangement of colors shown in FIG. 7 is used as an original for making a copy. In this case, it is not necessary to switch from the arrangement of colors shown in FIG. 6 to that shown in FIG. 7, and one only has to record outputs of the light receivers 9 and 10. This is because the original is already formed in accordance with the arrangement of colors shown in FIG. 7 when it is irradiated and read out.

The apparatus for carrying the method according to the invention may or may not need to switch the arrangement of colors from that shown in FIG. 6 to that shown in FIG. 7. When the original is a copy in seven colors made by means of an ordinary color printer, it is necessary to switch the arrangement of colors from that shown in FIG. 6 to that shown in FIG. 7. When a copy is to be made by using as an original a copy prepared in two colors by the method according to the invention, there is no need to switch from one arrangement of colors to the other. A controller 15 shown in FIG. 1 gives instructions when the arrangement of colors is to be switched from that shown in FIG. 6 to that shown in FIG. 7.

In FIG. 1, signals given to the printing drive circuit 14 comprise three color signals or signals for red, blue and black. The signal for black is added specifically for recording in black in a single color without requiring to print red on blue to provide red.

The invention is not limited to the system of representing colors in half-tone shown in FIG. 8. It is also possible to vary the tone of a color by varying the voltage impressed on the recording head as is the case with a printer of the heat-sensitive transfer-printing type using a dye of the sublimation type.

Figure 9:
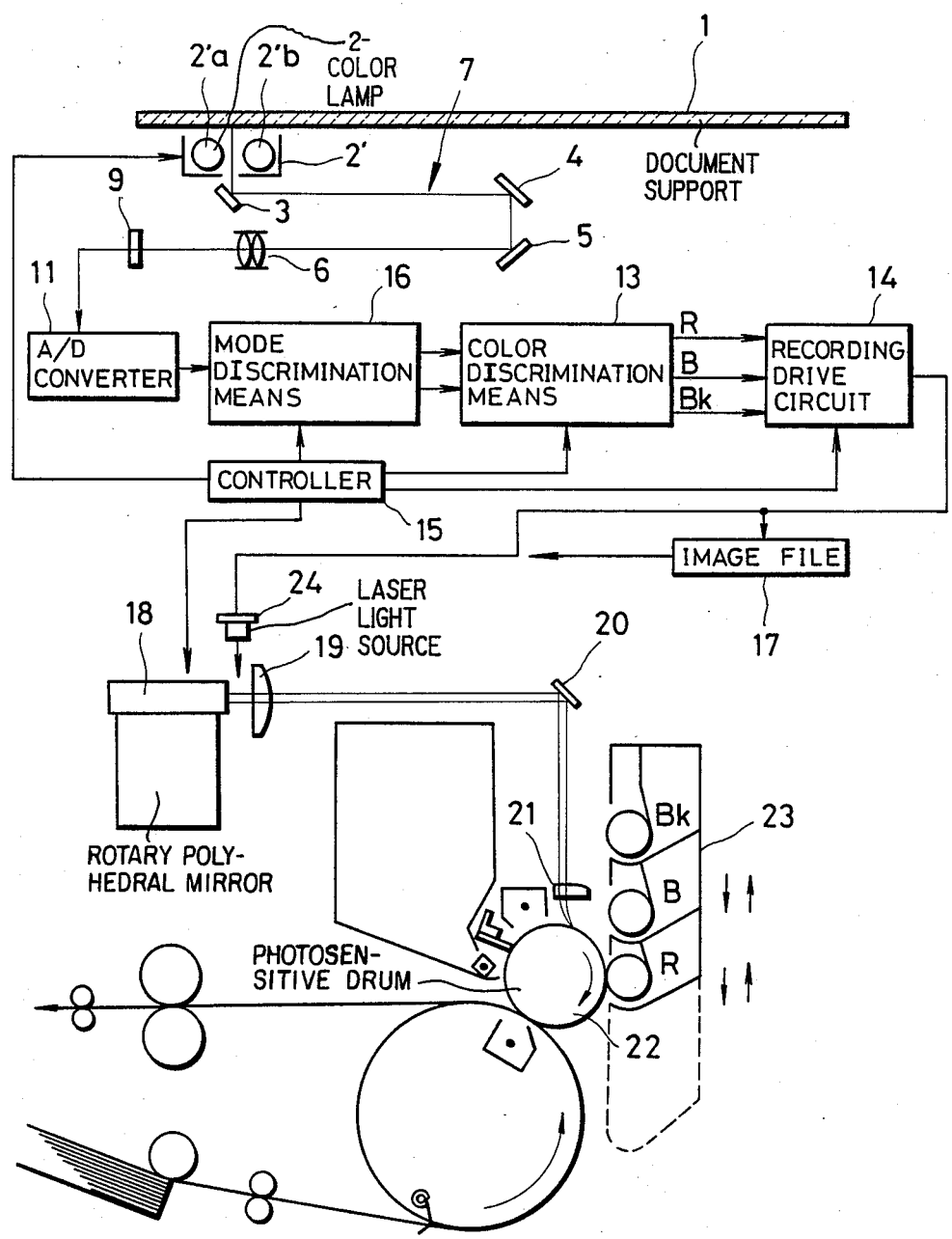
FIG. 9 is a view in explanation of a modification of the apparatus shown in FIG. 1.

FIG. 9 shows a modification of the printer of the copying apparatus shown in FIG. 1, in which a two color lamp system 2' is used as a light source and the spectral prism 8 is eliminated. Scanning is effected once by a scanner section including the light source 2' and optical system 7. In FIG. 9, parts similar to those shown in FIG. 1 are designated by like reference characters and description thereof is omitted.

Figure 10:
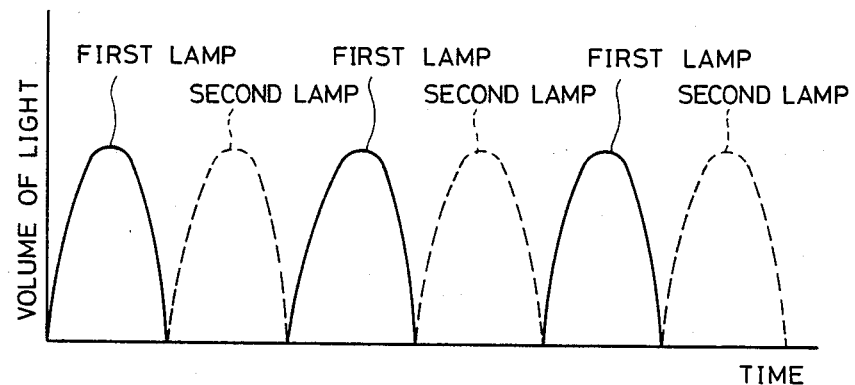
FIG. 10 is a view showing the manner in which the two lamps shown in FIG. 9 are lighted.

The light source 2' has two lamps of different light emitting wavelengths or a first lamp 2'a and a second lamp 2'b. The first lamp 2'a emits light rays of two colors of three primary colors or red, green and blue, and the second lamp 2'b emits light rays of the rest of the colors. When scanning is effected, the two lamps 2'a and 2'b are alternately lighted as shown in FIG. 10 and information on two colors is supplied to the single CCD 9. When the output of the CCD 9 is 1 for both the first lamp 2'a and second lamp 2'b, black is indicated.

When the output for the first lamp 2'a and 2'b is 0, white is indicated. When the output for the first lamp 2'a is 1 and that for the second lamp 2'a is 0, blue or green is indicated. When the output for the first lamp 2'a is 0 and that for the second lamp 2'b is 1, red is indicated. By using two lamps of different wavelengths, it is also possible to obtain information on three colors.

It is possible, of course, to form images on two CCDs by using two lamps of different wavelengths as is the case with the apparatus shown in FIG. 1. In this case, the first lamp 2'a emits light rays of blue and green, the second lamp 2'b emits light rays of red, a first CCD senses green and a second CCD senses red. The first CCD senses green when light is emitted by the first lamp 2'a and senses no color when light is emitted by the second lamp 2'b. The second CCD senses blue when light is emitted by the first lamp 2'a and senses blue when light is emitted by the second lamp 2'b. Thus, it is possible to obtain information on three colors by using two lamps and two CCDs.

In the modification shown in FIG. 9, the CCD (light receiver 9) effects photoelectric conversion of light rays and produces a signal which is supplied to the A/D converter 11 where the signal is changed into a digital signal.

Instructions are given by the controller 15 to a mode discrimination section 16 to determine whether the 2-bit digital output of the A/D converter 11 represents image light rays emitted by the first lamp 2'a or the lamp of the low wavelength band or image light rays emitted by the second lamp 2'b or the lamp of the high wavelength band. The image light rays thus subjected to mode discrimination are transmitted through the color discrimination means 13 to the drive circuit 14 which stores them in an image file 17 as image signals for discriminating tones of colors based on the system shown in FIG. 5 or 7.

When printing is performed, the image signals are retrieved from the image file 17 and supplied to the printer.

The image signals may be transmitted directly from the recording drive circuit 14 to the printer.

In the printer shown in FIG. 9, a photosensitive drum 22 is exposed to an image signal supplied from the recording drive circuit 14 or the image file 17 to write information to the surface of the photosensitive drum by means of a rotary polyhedral mirror 18, a fθ lens 19, a mirror 20, a lens 21 and a laser light source 24. An electrostatic latent image formed on the surface of the photosensitive drum 22 is successively developed by a developing device 23 with developing agents of two colors or red and blue or with a developing agent of black color so that different regions of the image are developed in different colors. The developed image is printed on a transfer-printing sheet by a known transfer-printing method and then fixed. The photosensitive drum 22 is processed in the same manner as that of a known copying apparatus.

The copying apparatus shown in FIG. 7 can be used as a facsimile system if the printer is separated therefrom. Outputs of the recording drive circuit 14 may be recorded for use as an image file.

What is claimed is:

1. A method of processing information on color images comprising the steps of:

forming a color image of a document with two types of light rays of a low wavelength band and light rays of a high wavelength band divided by using one wavelength as a boundary, by receiving separately the two types of light with two light receivers;

classifying each of the two types of light rays received in each of said two light receivers into more than three bands, with respect to the received light intensity;

digitizing each classified band of the two types of light rays respectively;

discriminating the color images depending on a matrix constructed by a combination of 2-bit digital signals of the two types of light rays; and developing images by using only two different colors for the two types of light rays, thereby the intensity of each color being determined depending on the 2-bit digital signals.

2. A method as claimed in claim 1, further comprising the step of:

classifying each of the two types of light rays received in light receivers into four bands with respect to light intensity.

3. A method of processing information on color images comprising the steps of:

splitting light rays representing an image of a multicolor document provided by irradiating the document with white light into two types of light rays of a low wavelength band and of high wavelength band divided by using one wavelength as a boundary;

forming optical images of the two types of light rays on two separate light receivers;

taking out image signals in the form of output signals classified into more than three bands with respect to light intensity from said two light receivers;

digitizing output signals from said light receivers with respect to the classified band of the light rays;

discriminating color images depending on a matrix constructed as 2-bit digital signals with respect to each of the output signals; and developing images by using only two different colors for each of the output signals, thereby intensities of each color being determined depending on the 2-bit digital signals.

4. A method of processing information on color images comprising the steps of:

forming images on two separate light receivers with respect to light rays representing an image of a multicolor document produced by two lamps emitting light rays of different wavelengths;

taking out image signals in the form of output signals classified into more than three bands with respect to light intensity from said two light receivers;

digitizing output signals from said light receivers with respect to the classified band of the light rays;

discriminating color images depending on a matrix constructed as 2-bit digital signals with respect to each of the output signals; and developing images by using only two different colors for each of the output signals, thereby intensities of each color being determined in dependent on the 2-bit digital signals.

* * * * *